Dec. 25, 1928.
C. A. FRALEY
1,696,435
EXPANSION JOINT
Filed May 8, 1923
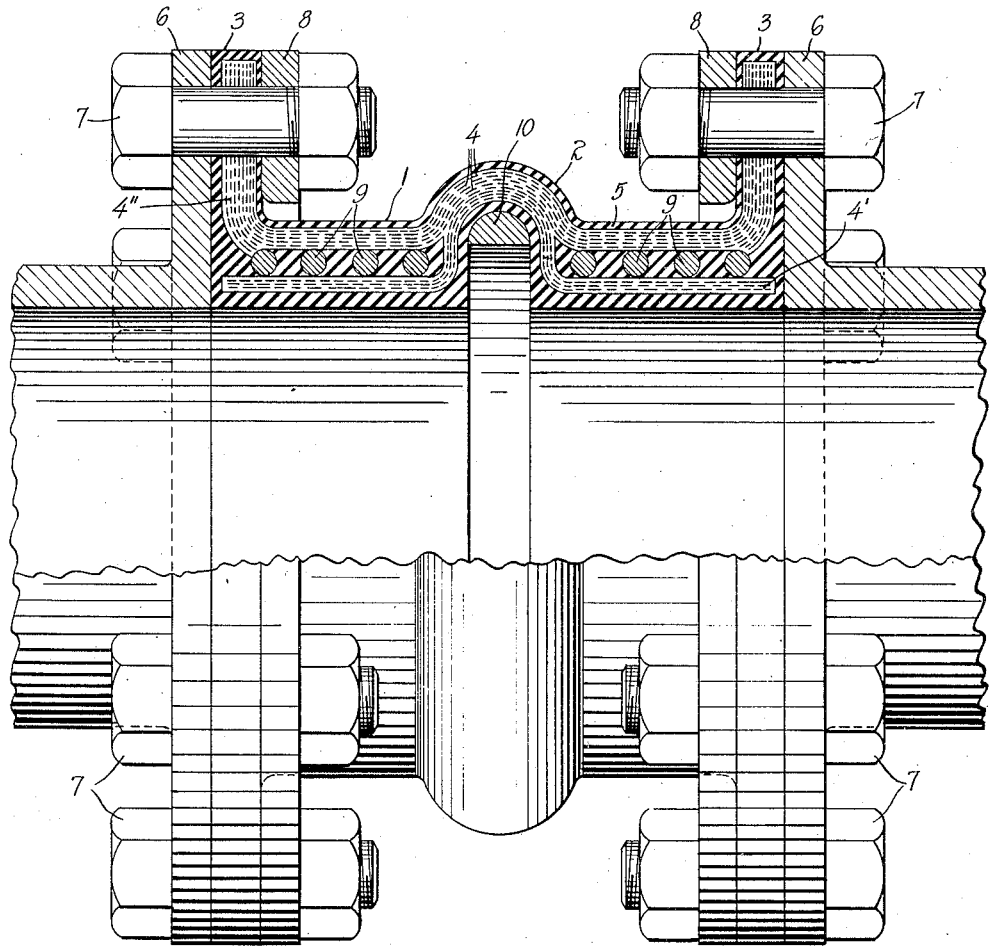
Inventor
CLIFFORD A. FRALEY
By his Attorney
Ernest Hopkinson Patented Dec. 25, 1928.

1,696,435

UNITED STATES PATENT OFFICE.

CLIFFORD A. FRALEY, OF BELLEVILLE, NEW JERSEY, ASSIGNOR TO REVERE RUBBER COMPANY, OF CHELSEA, MASSACHUSETTS, A CORPORATION OF RHODE ISLAND.

EXPANSION JOINT.

Application filed May 8, 1923. Serial No. 637,410.

This invention relates to expansion joints for use in pipe lines and similar places, and has for its principal object the production of a joint of simple construction and of increased strength and durability.

The drawing forming part of this specification is a view partly in elevation and partly in section showing a preferred embodiment of the invention.

Expansion joints of the present type are widely used in pipe lines and other places, as for instance in connection with condenser, pump, turbine, and similar equipment, where it is necessary or desirable, to absorb vibration, to provide a flexible connection, and to provide for the taking up of the expansion and contraction of the line due to changes in temperature, in order to prevent possible injury to the installation connected in the line.

Joints of this type are usually composed mainly of plies of fabric and vulcanized rubber compound, rendering them efficient vibration and shock absorbers, and are made of sufficient length to provide for the required degree of flexibility. While the joint forming the present invention is capable of widely modified forms, the present preferred embodiment comprises a tubular portion 1, an enlarged bulbous-like portion 2, and end flanges 3—3 for connecting the joint in the installation, all being composed of plies of fabric 4 and rubber compound 5 vulcanized thereto.

The joint is conveniently built up on a suitably shaped form in any usual or preferred manner. The plies of fabric extend entirely around the joint either as separate layers or in spiral formation, and in the main are of a width sufficient to extend from end to end of the joint thereby extending throughout the bulbous portion 2, the tubular portion 1, and the outwardly turned flanges 3—3. For convenience of construction one or more of the innermost plies as the plies 4' are not turned into the flanges but terminate at the ends of the tubular portion of the joint. The flanges may be further reinforced if desired as by the plies of fabric 4". The fabric component is rubber treated and is encased in rubber to better protect it from the destructive forces met in service, the parts being vulcanized together in a mold to provide an integral structure of great strength. The flanges are smoothly faced with rubber of sufficient thickness to form a fluid-tight fit with the corresponding flanges 6 of the section of pipe or other piece of apparatus to which it is to be secured, holes being provided in the respective flanges for receiving the securing bolts 7, which preferably also pass through a sectional metal ring 8 for securing the parts together. The bolt holes in the flanges of the expansion joint pass through the fabric wall so that each extremity of the plied up sheets of fabric composing the joint is firmly bolted in place thereby providing a flexible expansion joint of great strength.

Joints of this type are intended for use in both pressure and vacuum systems, that is to say in some instances the pressure may be applied to the walls of the joint from the interior, and in other instances from the exterior. To reinforce the expansion joint to withstand internal pressure reinforcements such as metal rings could be placed on the outside of the joint, but these would not reinforce the joint to support it against external pressure, and to provide for this other rings would have to be placed on the interior of the joint, which likewise would have no effect in supporting the joint against internal pressure. Therefore to provide for both pressures such reinforcements would have to be placed both on the outside and inside of the joint. This is not feasible and in any event only part of the rings would be in service at one time. In the present invention this objection is overcome by embedding the metal rings 9 within the wall of the joint and preferably between the plies of the fabric component. Any desired number of these rings may be employed extending throughout the length of the joint including the arched or bulbous-like portion 2. In the present instance four closed rings of relatively large diameter are shown between the plies of fabric, equally spaced and embedded in rubber compound at either side of the bulbous portion. This assemblage of parts being vulcanized in a mold under pressure forms a very strong unitary structure, which enables the reinforcing rings to support the joint either when internal or external pressure is employed. Moreover the rings are securely held in place and being entirely concealed are protected from the destructive forces present in service.

It has been proposed to use a coil of wire within the wall of the joint as a reinforcement, but such an expedient is undesirable. The main object of the joint is to permit relative movement of the parts of the system connected thereby, and to permit this, the joint, and therefore the wire coil, must necessarily be continually expanding and contracting. This causes variation in the diameter of the coil, which tends to produce an independent movemet of the wire, and in time separation of the vulcanized parts, thereby weakening the joint and shortening its period of usefulness. This objection is overcome in the present invention by the employment of the closed reinforcing rings. The movement of the joint has no effect upon these rings to change their diameters. They have no free ends similar to the coil which on account of the continual movement above mentioned will produce a destructive action in the wall of the joint. The rings are entirely independent of each other and are separated to provide a space entirely free from any metal reinforcements leaving the fabric and rubber components across this space free, thereby enhancing the flexibility of the joint. Moreover the rings may be advantageously placed to reinforce the shoulders formed by the junction of the tubular portion 1 with the flanges 3 and bulbous portion 2 as clearly shown in the drawing. This is impossible when a wire coil is employed on account of the pitch of the convolutions. It will thus be seen the employment of the rings in the manner described not only lends to simplicity of structure and economy in manufacture but also increases the durability of the joint.

The bulbous portion 2 is made large enough to take care of the required expansion and contraction and to overcome any tendency of this arched portion to collapse in vacuum systems it is preferably reinforced by the metal ring 10 disposed as shown within the hollow of the arch.

As many apparently widely different embodiments of this invention may be made without departing from the spirit thereof, it is to be understood that I do not intend to limit myself to the specific form of the invention as set forth except as indicated in the appended claim.

Having thus described my invention, what I claim and desire to protect by Letters Patent is:

An expansion joint comprising a tubular portion, an enlarged bulbous portion, and end connecting-flanges, formed of plies of fabric and rubber compound vulcanized thereto, metal reinforcing rings entirely enclosed within said plies of fabric and rubber compound, and a metal reinforcing ring within the hollow formed by the bulbous portion.

Signed at New York, county of New York, and State of New York, this 7th day of May, 1923.

CLIFFORD A. FRALEY.